Oct. 18, 1966 W. J. EUBANK 3,279,852
RETRACTOR SEAT BELT
Filed March 17, 1964 2 Sheets-Sheet 1
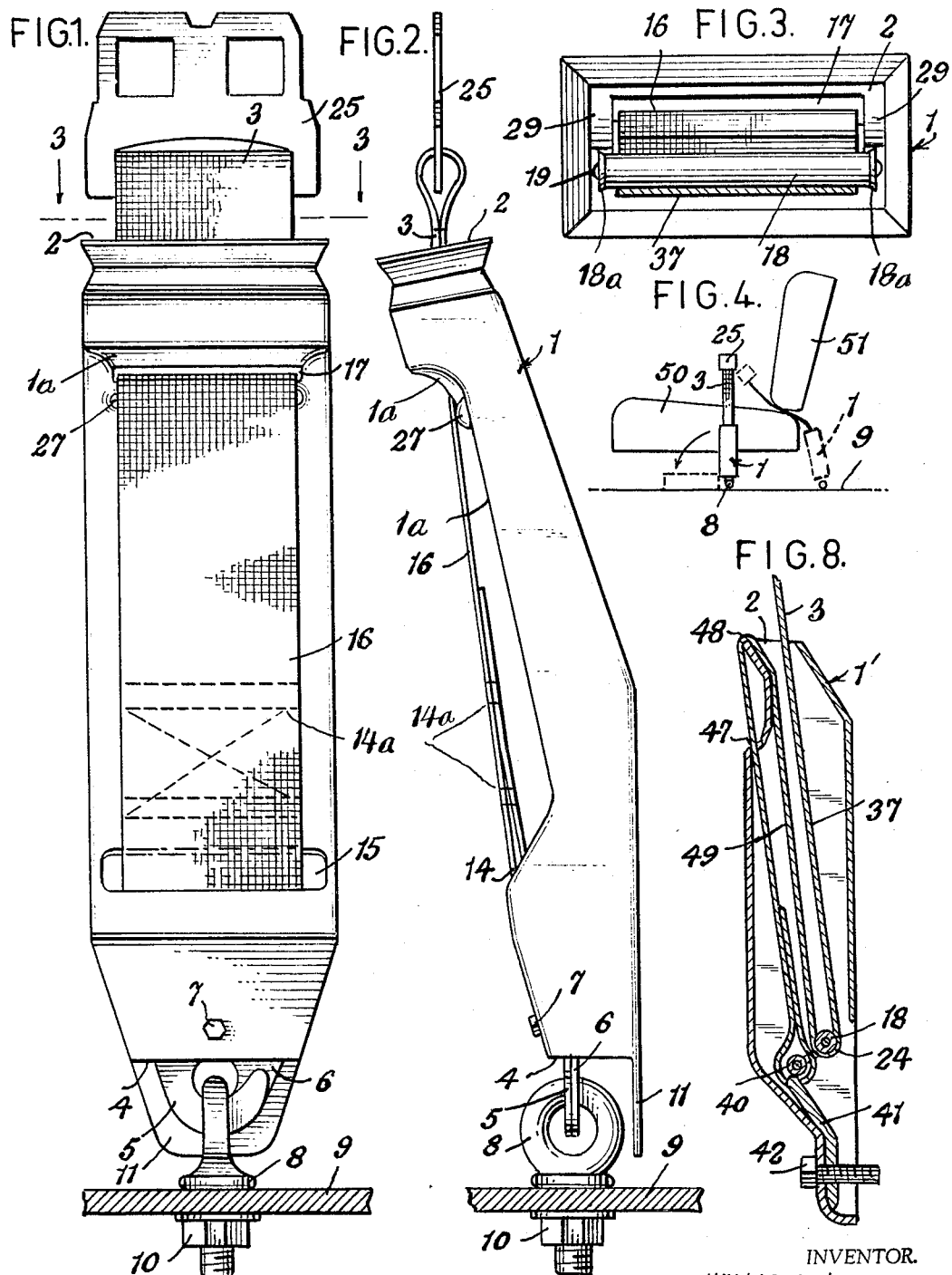
INVENTOR.
WILLIAM J. EUBANK
BY
Attorney Oct. 18, 1966   W. J. EUBANK   3,279,852
RETRACTOR SEAT BELT
Filed March 17, 1964   2 Sheets-Sheet 2
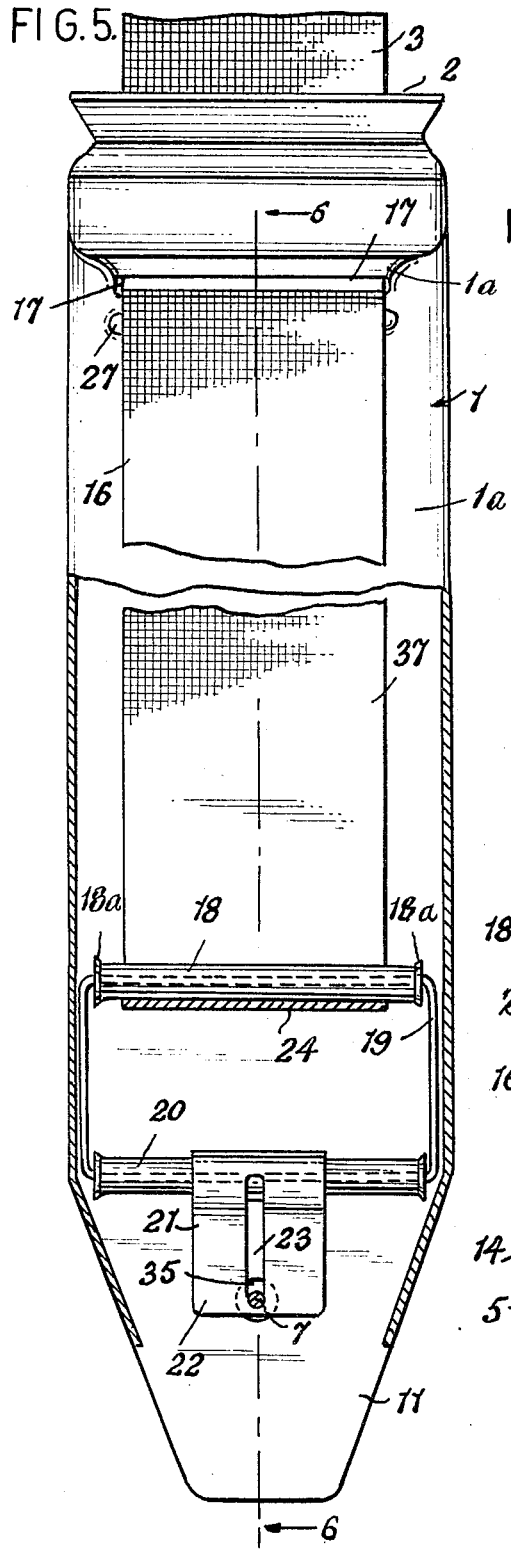
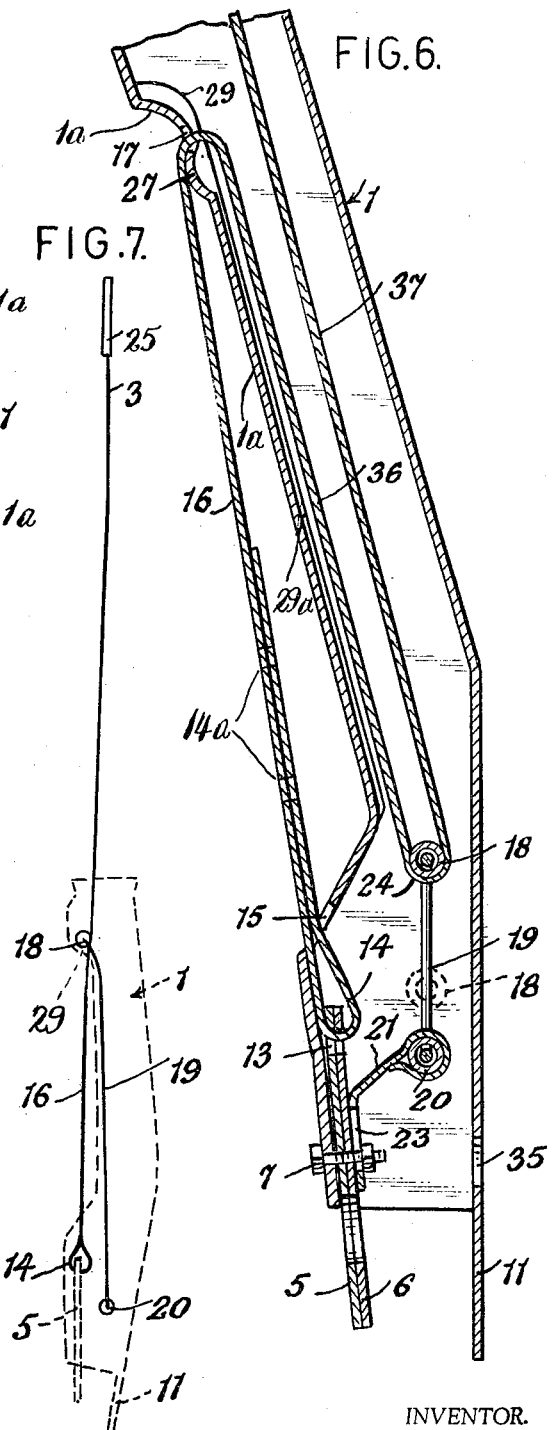
INVENTOR.
WILLIAM J. EUBANK United States Patent Office 3,279,852
Patented Oct. 18, 1966

3,279,852
RETRACTOR SEAT BELT
William J. Eubank, Livonia, Mich., assignor to American Safety Equipment Corporation, New York, N.Y., a corporation of New York
Filed Mar. 17, 1964, Ser. No. 352,602
6 Claims. (Cl. 297—388)

This invention relates generally to retractor-type safety belts of the character capable of use on airplane and automobile seats and other vehicles.

An object of the invention is to provide a device of this kind which will retract the belt or belt sections when the same is not in use thereby to maintain the belt out of the way of passengers entering or leaving the vehicle.

Seat belts not provided with retracting means give rise to dangling and loose belt ends which lie either across the seats or hang toward or lie upon the floor. The passenger in some instances sits upon the belt thereby rendering it difficult to reach for connecting the two parts of the buckle. In other cases, and particularly when the ends of the belt lie upon the floor, the car door is caused to be closed on a belt portion or a passenger is likely to trip thereover, thus causing an accident and resultant damage.

More particularly, an object of the invention is to provide a seat belt having retracting means serving to take belt end or belt ends out of the way of a passenger entering the vehicle; which will be of simple construction unlikely to get out of order, which will be easily applied to the vehicle; which will afford comfortable wear of the safety belt and which will be effective to prevent any violent forward movement of the body of the user upon sudden stoppage or acceleration change of the vehicle due to an accident or for any other reason.

Specifically, the invention contemplates a retractable safety belt structure provided with a housing or casing containing a freely-movable or so-called "floating" element such as a travelling roller or spool. The said belt at the forward end is adapted to carry a buckle element and at its opposite end is secured adjacent to the lower end of the housing, the belt extending forwardly from said lower end of the housing toward the housing forward end and intermediately passing through a slot near the latter end to enter the interior of the housing, the part of the belt located within the housing passing behind the travelling roller therein and then extending forwardly out of a mouth-like outlet opening or spool stowage pocket at the forward end of the housing and remote from the point of attachment of the belt to the housing. Anchorage means associated with the lower end of the housing to the vehicle are provided.

The travelling spool or roller is biased by suitable spring, resilient or elastic means anchored at one end to the housing and effective on the travelling roller, said means tending to resiliently urge the roller in a direction away from the said pocket end of the housing so that the roller, located in a bight in the belt, tends to retract the belt into the housing; and when the belt webbing is fully extended, the spool is forced into the stowage pocket by the webbing tension, there is no webbing slack and all reaction forces go directly from the buckle to the vehicle leaving no reaction forces going through the retractor case or spool.

These objects and other incidental ends and advantages of the invention will hereinafter be set forth in the progress of the specification and as pointed out in the appended claims.

In the accompanying drawings, wherein illustrative embodiments of the invention are disclosed:

FIG. 1 is a face view of a belt-retracting device made in accordance with the invention;

FIG. 2 is a side elevational view of the same;

FIG. 3 is a sectional view, taken substantially on the line 3—3 of FIG. 1, looking in the direction of the arrows;

FIG. 4 is a diagrammatic view showing how the belt-retracting device can be applied to an automobile or a car seat;

FIG. 5 is a face view of the device, on a slightly larger scale, with parts of the housing broken away and other parts of the device shown in sections to disclose construction;

FIG. 6 is a longitudinal sectional view, taken substantially on the line 6—6 of FIG. 5, looking in the direction of the arrows;

FIG. 7 is a diagrammatic view showing how the parts appear when the belt is in its extended condition; and FIG. 8 is a longitudinal sectional view through a slightly modified construction.

Referring to the drawings, 1 indicates generally the body of the housing or casing in which most of the operating parts of the device are contained. The housing may be shaped substantially as shown or in any other required or desirable shapes. It may be made of light-weight metal, plastic or other suitable material.

Housing 1 as shown is of elongated, tubular formation and is open at both ends. One of these ends shown at 2 is of flared form and constitutes an outlet mouth from which the part of the belt shown at 3 emerges and through which it is retracted. Located within the housing at the opposite end 4 are suitable attaching means such as an attaching loop formed by overlying, hook-shaped plates 5 and 6, which plates are attached to a wall of the housing by any suitable securing means or bolt 7. The loop formed by the plates 5 and 6 receives an eye-bolt 8 which is adapted to pass through a hole in the floor 9 of the car or through some other suitable location at which the device can be properly mounted to the car framework, and the nut 10 received on the bolt mounts the housing in such required position.

One of the walls of the housing is formed with a protective apron 11 located behind the attaching means. Apron 11 serves as a stop to prevent the retractor from falling out of the vehicle door for top of sill mounting installations. The plates 5 and 6 each have a slot 13 (FIG. 6) at the upper ends through which a looped end 14 of the belt is passed for permanently attaching this end of the belt to the hook-shaped plates. Adjacent areas of the loop are secured together as by stitching 14a (FIGS. 1 and 2).

Located near this area of attachment of the belt, is a transverse slot 15 formed in the wall of the housing, and the belt emerges from said area of attachment and passes out through the slot 15. The belt then extends along the outside of the housing toward the outlet end thereof as shown at 16 and then enters into the interior of the housing through the transverse slot 17 formed in the housing near said outlet end.

Located within the housing and extending transversely thereof, is the travelling roller 18. Said roller is capable of movement in all directions so that it may best be described as being floatingly mounted within the housing. In addition to being floatingly mounted, the roller is capable of rotative movement when the belt is advanced in a direction out of the housing or is retracted therein.

Connected at one end through roller 18 is an assembly including resilient elements and anchored to plates 5 and 6 at the other end to afford rotation, extension and retraction of said roller. This roller function may be effected by any suitable means and assembly. As shown by way of example, the assembly may be comprised wholly of an elastic element such as 19 extending axially through roller 18 at one end and functionally anchored at the other end to plates 5 and 6. Elastic element 19 for anchorage is connected to plates 5 and 6 as shown by way of example as by passing through a fixed tube or sleeve 20 secured in the housing 1 near the end 4 thereof. Said tube 20 is fixedly mounted in the housing as by means of a clip 21 which encircles the tube 20 and has a projecting plate portion 22 slotted as at 23 to receive the securing means or bolt 7 and be thus attached to the housing. The arrangement is such that roller 18 is biased by the elastic cord or other resilient element and formation utilized in a manner to urge it toward the end 4 of the housing and toward the opposite end or fixed tube 20 and substantially to the dotted line position shown in FIG. 6.

As shown in FIG. 6, portion 36 of the belt which enters into the housing through slot 17 extends in the direction of the end 4 of the housing and said part of the belt forms a bight 24 around roller 18 and then extends in the opposite direction or toward the outlet opening 2 as shown at 37, and then passes out through such opening, the belt being provided at its end with a buckle element such as latch plate 25 as seen in FIG. 1. The face of the housing may be provided near said slot with a rounded, raised rib 27 so that the belt may smoothly slide thereover and so that the housing in this area is reinforced against deflection to prevent possible retraction from extended position of the belt web.

From the foregoing, the structure and operation of the safety belt and the retractor elements thereof will be apparent. The biased travelling roller 18, normally urged toward the end 4 of the housing by the pull imposed on it by the elastic loop 19, forms the bight 24 in the belt and resultantly acts to draw or retract the belt into the housing so that when the belt is not in use it will be automatically retracted.

It will be understood that the buckle element such as latch plate 25 is fitted into a cooperating buckle element on another cooperating belt section and which latter can be housed in a housing similar to that which has been described. The two belt sections are then brought together and the buckle and the latch plate elements located respectively on the belt sections, being interengaged. As an alternative, a single belt can be used and the same may be brought across the body of the user and coupled to a connection anchored to the car seat or car framework.

In fitting the belt across the body of the user, it can be adjusted as to length through one or the other of the buckle parts in the conventional manner (not shown) to cause the belt to fit comfortably on the wearer while the belt whether of one or two belt sections is in its fully extended position. However, at maximum belt length adjustment, dimensions of the device and parts are adapted for full belt retraction.

As diagrammatically illustrated in FIG. 4, the device can be attached to the floor 9 of the vehicle framework at each of both ends of the seat 50 and brought across the body of the passenger. When the belt is not in use and is retracted, each of the housings 1 and its contained and retracted belt sections can be swung downwardly to the floor as indicated in dotted lines in FIG. 4. As an alternative, the device can be attached to the floor behind the seat, as shown at the right in FIG. 4 and the belt brought forwardly to operating position through the space between the seat cushion 50 and the seat back 51. Other means of mounting the device are also possible.

Under normal use and in extended position there is sufficient tension in the belt webbing to force roller 18 into an offset position into a stowage area adjacent the housing end 2 as will appear. At such outstretched position there is substantially no slack in said webbing and reaction forces are transmitted directly from the buckle elements at 25 to the anchorage at floor 9 thereby eliminating such forces on case 1 and on the roller 18.

Thus, when a sudden stop or accident occurs the belt becomes extended to its limit. This is diagrammatically illustrated in FIG. 7 wherein a pull exerted on the free end of the belt, such as would occur on a sudden stop of the vehicle, has pulled the belt out to the limit of its extension. When such a pull is imposed on the belt, the travelling roller 18 is moved forwardly against the bias of the elastic cord 19, toward the outlet end 2 and to such an extent that the bight 24 of the belt nearly disappears and the belt assumes a substantially straight line from its point of attachment to the housing and its free end. As a result the pull imposed on the belt is transmitted as above stated neither to roller 18 nor to any part of housing 1 but rather to the anchorage for the attached, looped end of the belt.

Thus, there are provided on the inner side of the housing wall 1a below outlet end 2 laterally disposed curved surfaces or ramps 29 extending from lateral longitudinal runners 29a. Such curved surfaces constitute cam surfaces against which the flared ends 18a of the roller 18 can ride to bring the roller 18 into the stowage pocket or area (FIGS. 3 and 7) when the belt is in maximum outstretched position. The runners 29a on which roller ends 18a ride and between which the belt webbing is disposed tend to improve the torque on the spool for retraction and further help to eliminate jamming or hang-up of the webbing when an extremely stiff type of webbing is used.

In FIG. 8 is shown a slightly modified construction in which the greater part of the belt is contained within the housing while the belt is in its retracted position. The fixed end of the belt is attached to a plate 41 that is anchored in one end of the housing 1' by a screw or other fastening member 42 that can be connected to means for mounting the housing on the floor or other required location on the vehicle. The loop on the belt may also surround the fixed tube or sleeve 40 and hold it in place, or other means for fixedly mounting said loop may be used. From its point of connection to the plate 41, the belt extends toward the outlet end of the housing and passes to the exterior of the housing through a transverse slot 47 therein. The belt then extends around a wall of the housing at the outlet end thereof as shown at 48 to re-enter the housing and to then extend to and form a bight around the travelling roller 18 which is connected to the fixed tube 40 by means of an elastic cord or loop member as described in connection with the embodiment of FIGS. 1 to 7. After forming the bight around the travelling roller 18, the belt extends toward and passes out of the housing through the outlet end 2 thereof. The operation of this embodiment is substantially similar to that of the first-described device.

The structures described in the illustrational embodiments shown thus provide a retractor-type safety seat belt including a housing structure and associated means adapted for multiple functions of anchorage to the vehicle seat or other vehicle framework element or floor, attachment of a seat belt end and retraction to the housing of the seat belt when not in use by means of the biased roller or reel 18.

The structures described and illustrated thus provide a safety belt which when in outstretched and operative condition, affords the transmission and reaction forces on the belt to operate substantially without imposition of forces on housing 1 and reel or spool 18, said forces going directly from buckle element to anchorage or floor and along the webbing length.

It is understood that minor changes and variations in the materials, parts, connections and disposition of elements may all be resorted to without departing from the spirit of the invention and the scope of the appended claims. Specifically, placement of elements and parts thereof relative to the interior or exterior of housing 1 may be varied to the extent that functions are not substantially modified.

I claim:
1. A belt-retracting device comprising, an elongated hollow housing having an outlet opening at one of its ends, a belt having one end secured in the housing at a point remote from the outlet opening, a roller floatingly located in the housing, an elastic loop extending through the roller and floatingly carrying and biasing the same in a direction away from the outlet opening, the housing having at least one slot, the belt extending through the slot and entering into the interior of the housing and passing behind the roller in a bight and then extending forwardly and passing out of the outlet opening in the housing.

2. A belt-retracting device as provided for in claim 1, wherein the housing has a second slot spaced from the said slot and the belt has a portion extending along the outside of the housing before passing through the said second slot, a fixed sleeve mounted in the housing near one end thereof, the elastic loop passing through the sleeve and through the roller.

3. A belt-retracting device comprising, an elongated hollow housing open at least at one of its opposite ends, an attaching member mounted at one of said ends, the opposite end of the housing constituting a belt outlet, a fixed tube extending across the interior of the housing adjacent to the attaching member, an elastic loop extending through the tube, a roller through which the elastic loop passes, the elastic loop being effective to urge the roller in a direction toward the tube, a belt anchored at one end to the attaching member, the housing having a slot near its outlet end, the belt extending from its point of anchorage toward the slot and passing therethrough to enter into the housing and to then extend in a bight behind the roller and then extend forwardly and out of the belt outlet.

4. A belt-retracting device as provided for in claim 3, wherein the roller is a travelling roller and is floatingly mounted within the housing and is mounted therein solely by its attachment to the elastic loop, the belt having a portion located on the outside of the housing and having another portion extending on the inside of the housing between the slot and point of anchorage of the belt.

5. A belt-retracting device comprising, a hollow, elongated housing having a pair of spaced slots in one of its walls, a belt having an end anchored in the housing near one of the slots, the belt passing through said slot and extending along the outside of the housing and then passing through the other slot and entering into the housing, a roller floatingly mounted within the housing resiliently biased toward the point of attachment of the belt, the part of the belt located within the housing extending in a bight behind the roller and then extending out of an end of the housing remote from the point of attachment of the belt to the housing.

6. A belt-retracting device comprising, a hollow, elongated housing having an outlet opening at one end, an attaching means at its opposite end, the housing having a pair of slots in one of its walls, a belt passing through one of the slots and having a looped end secured within the housing near said slot, the belt having a part passing along the outside of the housing and extending through the second slot to enter into the housing and normally form a bight therein, a roller positioned across the interior of the housing and located in the bight in the belt, an elastic cord in the housing and extending through the roller and being effective to retain said roller in the housing and to bias said roller toward the attaching means and in a direction away from the outlet opening, the belt having a stretch extending from its bight toward and out of the outlet opening, said stretch terminating in a buckle element.

References Cited by the Examiner
UNITED STATES PATENTS

| | | | |
|---|---|---|---|
| 310,180 | 1/1885 | Brundage | 297—385 |
| 2,118,114 | 5/1938 | Schenk | 272—82 |
| 2,590,951 | 4/1052 | Farison | 272—82 |
| 2,799,322 | 7/1957 | Jordan | 297—385 X |
| 2,963,080 | 12/1960 | Zang | 297—388 |
| 3,065,027 | 11/1962 | Misslich et al. | 297—388 |
| 3,126,228 | 3/1964 | Greene et al. | 297—385 |
| 3,128,124 | 4/1964 | Fredericks et al. | 297—388 |
| 3,171,688 | 3/1965 | Nicholas | 297—388 |
| 3,184,267 | 5/1965 | Rumble | 297—388 |

FRANK B. SHERRY, *Primary Examiner.*

R. B. FARLEY, *Assistant Examiner.*